United States Patent [19]

Armand et al.

[11] Patent Number: 4,758,483

[45] Date of Patent: Jul. 19, 1988

[54] NOVEL MACROMOLECULAR MATERIAL FOR USE IN REALIZING ELECTROLYTES AND/OR ELECTRODES

[75] Inventors: Michel Armand, Domaine Jean Jaures Allee; Daniel Muller, Pau, both of France; Michel Duval, Montreal; Paul E. Harvey, St-Hubert, both of Canada; Jean M. Chabagno, Pau, France

[73] Assignees: Societe Nationale Elf Aquitaine, Courbevoie, France; Hydro-Quebec, Montreal, Canada; a part interest

[21] Appl. No.: 774,915

[22] Filed: Sep. 11, 1985

Related U.S. Application Data

[63] Continuation-in-part of Ser. No. 584,535, Feb. 28, 1984, Pat. No. 4,578,326.

[51] Int. Cl.$^4$ .................. H01M 6/18; H01M 10/40
[52] U.S. Cl. .................. 429/192; 252/62.2
[58] Field of Search .................. 429/192; 252/62.2

[56] References Cited

U.S. PATENT DOCUMENTS 4,556,614 12/1985 Mehaute et al. .................. 429/192
4,578,326 3/1986 Armand et al. .................. 429/192

*Primary Examiner*—Donald L. Walton
*Attorney, Agent, or Firm*—Weiser & Stapler

[57] ABSTRACT

A solid polymeric electrolyte comprises a macromolecular material in which there is dissolved an ionic compound, particularly an ionic compound in solution in a copolymer of ethylene oxide and a second unit selected so that the copolymer chain maintains a polyether characteristic. Also a high performance composite electrode embodying this electrolyte, and a process for obtaining this electrolyte.

24 Claims, No Drawings

NOVEL MACROMOLECULAR MATERIAL FOR USE IN REALIZING ELECTROLYTES AND/OR ELECTRODES

The present application is a continuation-in-part of application Ser. No. 584,535, filed Feb. 28, 1984, now U.S. Pat. No. 4,578,326 which is herein incorporated by reference.

The present invention relates to a novel solid polymeric electrolyte comprising a macromolecular material in which there is dissolved an ionic compound. It also relates to new high performance composite electrodes embodying this electrolyte, as well as to a process for obtaining this electrolyte.

Solid polymeric electrolytes are known and, for example, are described in European Pat. No. 0013199. This patent describes among others the utilization of a macromolecular material constituted by at least one homopolymer, for example, one polyether, or at least copolymers.

In French Patent application No. 2 485 274, which corresponds to U.S. application Ser. No. 500,191, now U.S. Pat. No. 4,542,081 which is incorporated herein by reference, there is disclosed a solid electrolyte which comprises a crosslinked macromolecular material. The crosslinking is made from macromolecular material (or polymer) which contains hydroxyl groups, these groups being crosslinkable by isocyanates. The crosslinking process is similar to the process of forming wherein the hydroxyl groups are susceptible to reaction with the materials of the anode and/or the cathode so as to initiate a degradation reaction of the polymer and thus prevent it from becoming an elastomeric ligant for the electrode. Such degradations occur at the same time as the irreversible oxidation or reduction of the electrode material.

The products obtained according to the above described process of crosslinking have a high non-cation solubility, which can minimize the dissolution and/or the dissociation of the ions compound and thus lower the conductivity. This effect can be attributable to the large size of the noddles or cross-linkages. If one tries to solve the problem of poor solubility, it would be expected to increase the molecular weight of the starting polymer. However, this could cause a decrease of the ionic conductivity of the material because of the crystallization phenomena which occurs at low temperatures.

In order to minimize the crystallization phenomena, the above-mentioned patent application describes embodiments in which the copolymers are copolymers of ethylene oxide and of a second unit. The amount of the second unit being in varying ranges. These copolymers are tri-block copolymers.

With these tri-block copolymers, particularly with ethylene oxide, propylene oxide and ethylene oxide copolymers (EO-PO-EO), it is too difficult to increase the molecular weight because of the rapidly occurring phase separation phenomena. Consequently, the same problems as with the corresponding homopolymers at ambient temperature occurs.

In order to improve the characteristics of the electrolyte materials, more particularly, their ambient temperature conductivity characteristics, the present invention provides a novel ionically conductive macromolecular material comprising an ionic compound in solution in a copolymer of ethylene oxide and of a second unit, said second unit being selected so that the copolymer chain or backbone maintains its polyether characteristic. The second unit is present in a mole range of less than 30%, and said copolymer is a random copolymer.

By the term polyether characteristics of the backbone, it is understood to mean that the chain comprises an alternation of oxygen atoms and carbon atoms in which two consecutive oxygen atoms are separated by at least one carbon atom. The term "random copolymer" means a copolymer with a statistical placement of monomer units in a manner whereby there are no recurring units.

According to a preferred embodiment of the present invention, the second unit is:

(1) a substituted ether oxide having the formula (I):

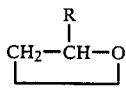

wherein R represents a Ra Radical, Ra being an alkyl, alkenyl or alkynyl radical having 1 to 12 carbon atoms, preferably, 1 to 4 carbon atoms, or a —CH$_2$—O—Re—Ra radical in which Ra is as hereinbefore described and Re represents a polyether radical of the formula (CH$_2$—CH$_2$—O)$_p$, wherein p=0 to 10, or (2) a cyclic ether oxide, substituted or unsubstituted, wherein the cycle has more than three carbon atoms.

For example, the cyclic ether oxides can be selected from the group consisting of tetra-hydrofurane, 1-3, dioxane, dioxolane and their substituted derivatives. Also, the cyclic ether oxide can be a cyclic compound similar to oxethane.

According to another embodiment of the invention Ra can be an alkyl radical, for example, a methyl radical and the second monomeric unit is present in an amount ranging from 0 to 25%, in molar percentage with respect to the total number of monomeric units. This amount is selected according to the salt or ionic compound in solution and on the utilization temperature. Preferably, said amount ranges between 1.5 and 25% when the salt is lithium perchlorate and higher than 5% when the salt is lithium trifluoromethane sulfonate.

According to this same embodiment, the radical R can be a —CH$_2$—O—Re—Ra radical and preferably a —CH$_2$—O—CH$_3$ or —CH$_2$—O—CH$_2$—CH—CH$_2$ radical and the second monomeric unit is present in a quantity higher than zero- and lower than 30%, the percentage being a molar percentage expressed with respect to the total number of moles of the electrolyte. In a preferred manner, this percentage is comprised between 1.5 and 30% when the salt is lithium perchlorate and higher than 5% for lithium trifluoromethanesulfonate.

According to a second embodiment of the invention, the second monomeric unit of the copolymer is selected from among the substituted or non-substituted cyclic ether oxides, whose cycle comprises three bonds. Its molar percentage is preferably higher than zero and lower than 30%. By way of non-limitative example, these cyclic ether oxides the cycle of which comprises more than three bonds can be: oxethane, tetrahydrofurane, 1-3, dioxane, dioxolane, and their substituted derivatives.

The applicants have indeed discovered that it was possible to improve the ionic conduction macromolecular materials of the prior art by using an ethylene oxide copolymer and a second monomeric unit such as those defined herein-above and the structure of which conserves to the chain its polyether character.

For example, in the case where the second monomeric unit is selected from among the ether oxides of formula (I), the chain obtained has an ethylene polyoxide structure certain hydrogen atoms of which are substituted by radicals. Their chain is characterized by a regular alternation of two carbons and an oxygen:

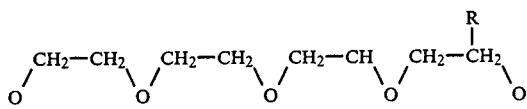

In the case where the second monomeric unit is selected from among cyclic ether oxides, the cycle of which comprises more than three chains, a polyether chain is obtained in which the oxygen atoms can be separated by more than two carbons or by a single carbon, according to the nature of the second initial monomeric unit.

For example, an methyl-3-oxetane-ethylene oxide copolymer will have the following structure:

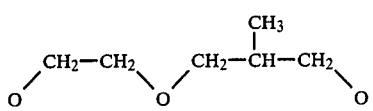

a dioxolane-ethylene oxide copolymer

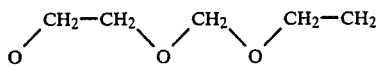

a 3-TH methyl ethylene oxide copolymer:

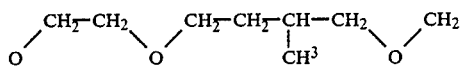

The applicants consider that the improvement proposed by the present invention and which is revealed especially by an increase in conductivity at ambient temperature, is principally due to the introduction, in a polyether type chain, of structural irregularities that allow to reduce, even to completely prevent, the appearance of crystalline phases at utilization temperatures, while conserving the polyether structure of the chain, i.e., its solvatation power of the salt in solution and without impairing the ionic mobility. This characteristic can allow to obtain an amorphous and isotropic material, i.e. a single amorphous phase that is thermodynamically stable, particularly at ambient temperature.

According to another preferred embodiment of the invention, the random copolymers are crosslinked copolymers.

These crosslinked copolymers according to the invention can be obtained by any known crosslinking chemical or physicochemical method. In accordance with the physicochemical method, it is possible to use radiation or any kind of thermal treatment.

Preferably, the crosslinked random copolymers according to this embodiment can be the result of the reaction of crosslinkable units and at least one crosslinking agent selected so that the crosslinked copolymer has short crosslinks. For example, such short crosslinks can be constituted by a metal or a non-metal atom which is at least divalent and connected to at least one polymer chain, for example by the intermediary of an oxygen atom. The crosslinking member can be, for example, silicon, cadmium, boron, aluminum, zinc, magnesium or tin.

Crosslinks which are long, for example, are obtained by a crosslinking process as disclosed in copending application Ser. No. 687,902, filed Dec. 12, 1984 now U.S. Pat. No. 4,579,793. That is, the polymer is crosslinked in the presence of alphatic triisocyanate (Desmodur N) between two polymers whereby a crosslink compound of three urethane units and two $(CH_2)_6$ units are obtained as follows:

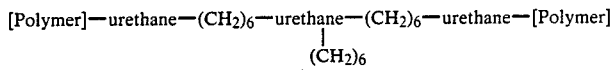

The short crosslinks are represented for example as follows:

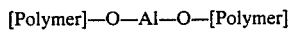

Such crosslinking methods are described in application Ser. No. 687,902 filed Dec. 31, 1984 and application Ser. No. 739,057 filed May 29, 1985, now U.S. Pat. No. 4,620,944 which are herein incorporated by reference.

The copolymers according to the invention are preferably three dimensional crosslinked polymers. However, the invention is also concerned with macromolecular materials in which the copolymers have bi-dimensional crosslinks.

According to the invention the macromolecular material can be obtained by either ionic or free radical crosslinking reactions involving unsaturations which are distributed along the backbone and/or situated at the ends thereof.

With respect to the ionic compounds, any of those defined in the above-mentioned European Pat. No. 0013199 can be used, as well as those defined in U.S. application Ser. Nos. 500,194 now U.S. Pat. No. 4,556,616; 500,191 and 500,193, now U.S. Pat. No. 4,505,997 filed on June 1, 1983, or in PCT application Ser. No. PCT/FR83/00076 filed on Mar. 16, 1983 and designating the United States, all of said applications being herein incorporated by references.

As it will become more explicit in the following examples, the invention provides ionically conductive materials which have improved characteristics over non-crosslinked copolymers and over the regularly sequenced polymers and copolymers of French Patent application No. 2 485 274.

Particularly, the ambient temperature ionic conductivity is improved. This improvement could be attributed to the fact that the utilization of random copolymers enables increasing the molecular weight of the starting units, thus minimizing the negative effect of the crosslinks noddles without generating crystallization and/or segregation phase phenomenas at ambient temperature which occur in the prior art.

Another advantage of the invention over a regularly sequenced copolymer is the decrease of the anionic transport number.

The invention and its advantages will become more understood from reading the following examples, which are not intended to limit the invention.

In the following examples, a comparison is made between the materials according to the invention and the materials of the prior art. More particularly, a comparison is made between crosslinked homopolymers, melts of homopolymers and blocks polymer as described in French Pat. No. 2 485 274.

The lithium salt for the examples is lithium perchlorate which was dissolved and present in the polymer in the form of a monophase amorphous system in the same manner as shown in the examples of application Ser. No. 584,535.

For all of the materials, a study was made for the temperatures at which the ionic conductivity had the following value:

$$\sigma = 10^{-6}(\Omega^{-1} cm^{-1}) = T-6$$

$$\sigma = 10^{-5}(\Omega^{-1} cm^{-1}) = T-5$$

$$\sigma = 10^{-4}(\Omega^{-1} cm^{-1}) = T-4$$

EXAMPLE 1

A polyethylene oxide was crosslinked with a polyethylene glycol having a molecular weight of 3000, in the presence of an aliphatic tri-isocyanate, methyl trichlorosilane and in the presence of aluminium tri-octyl.

There was thus obtained three macromolecular materials wherein each contained lithium perchlorate with a $O/Li=12$.

The first material had large crosslink noddles, of the kind of polyurethane. The second and the third had short noddles.

EXAMPLE 2

In this example, the materials were similiar to the materials of Example 1 but the copolymer was a tri-sequenced block copolymer, EO- PO- EO, having a molecular weight of 8500, with a O/Li ratio of 12/1.

EXAMPLE 3

In this example, there was utilized a random copolymer of ethylene oxide and propylene oxide according to the invention, obtained by each of the crosslinking methods of Example 1 and having a molecular weight of 10,000.

In one case the O/Li ratio was 12/1 and in the other, this ratio was 20.

The copolymer contained 25% (molar) propylene oxide.

EXAMPLE 4

This example was concerned with a random crosslinked copolymer of ethylene oxide and methylglycidylether.

RESULTS

Example 2 provided similiar material to Example 2 of French patent application No. 2 485 274. According to Example 2 of said application No. 2 485 274, the conductivity was $10^{-4} \Omega^{-1} cm^{-1}$ at 50° C. while the conductivity of Example 2 of the present invention was $10^{-4} \Omega^{-1} cm^{-1}$ at 110° C.

This difference between the results of Example 2 of French application No. 2 485 274 and Example 2 of the present invention, can be easily explained by the fact that the salt of the French application No. 2 485 274 is sodium tetraphenyl borate, which has a higher ionic conductivity than a lithium salt, and also by the fact that, in application No. 2 485 274, the salt concentration is very low (nearly 1/72), while the salt concentration in the example of the invention was equal to 1/12. It is known that the ionic conductivity increases when the salt concentration decreases, particularly at low temperatures.

EXAMPLE 5

This example related to a random copolymer of ethylene oxide and alkylglycidylether, the last being present in a 3% molar amount. The employment of a polymerization catalyst such as a solvated alumoxane enabled the maintenance of the alkyl units during the polymerization. The copolymer obtained contained about 50 milliequivalent of unsaturations for each 100 grams of polymer.

This material was used to make electrolytes and/or composite electrodes by an exsolvant method, in the presence of free radical sources, such as azobiisobutyronitrile (A.Z.B.N.).

The crosslinking of the material was obtained by raising the temperatures above 60° C.

Without A.Z.B.N., the crosslinking can be obtained by irradiation with or without any photosensibilisator.

This crosslinked material was amorphous at ambient temperatures and had excellent elasticity properties (up to 500% of elongation before breaking) which renders it particularly useful for the realization of ambient temperature electrochemical secondary and/or primary cells. Such a cell, and particularly a secondary cell, has a very high utilization rate, which is constant over a large number of cycles. This characteristic is very important and notable since it is well known that the utilization rate is one of the most penalizing phenomena of the electrochemical secondary cells of which the ionic macromolecular material is prepared according to the prior art methods, and particularly, for temperatures lower than 60° C.

Similiar increases of the utilization rates are observed for the other materials according to the invention.

What is claimed is:

1. An improved amorphous, single phase solid electrolyte which possesses improved ionic conductivity, absence of crystallinity, thermo dynamical stability, high cation solubility and improved elasticity at ambient temperatures, which electrolyte is a random polyether copolymer of ethylene oxide and an ether oxide selected from the group consisting of a substituted ether oxide of the formula

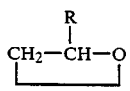

wherein R is Ra, wherein Ra is alkyl, alkenyl, or alkynyl having 1 to 12 carbon atoms or —CH$_2$—O—Re—Ra wherein Ra is defined above, Re is a polyether of the formula —(CH$_2$—CH$_2$—O)$_p$— wherein p is an integer from 0 to 10 and a cyclic ether wherein the ring has more than 3 carbon atoms.

2. The electrolyte of claim 1 wherein said copolymer is cross-linked.

3. The electrolyte of claim 2 wherein the cross-linking is by means of a short cross-linking agent.

4. The electrolyte of claim 3 wherein the short cross-linking agent is selected from the group of a metal, or a non-metal atom which is at least divalent.

5. The electrolyte of claim 4 wherein the short cross-linking agent is selected from the group consisting of silicon, cadmium, boron, titanium, aluminum, zinc, magnesium and tin.

6. The electrolyte of claim 4 wherein the cross-linking agent is linked to a polymer chain by an oxygen atom.

7. The electrolyte of claim 1 wherein the proportion of ether oxide is less than 30 mole percent.

8. The electrolyte of claim 1 wherein the polyether is —$CH_2$—O—Re—Ra, wherein Re and Ra are defined in claim 1.

9. The electrolyte of claim 1 wherein the ether oxide is selected from the group of tetrahydrofurane, dioxolane and their derivatives.

10. The electrolyte of claim 1 wherein the ether oxide is a cyclic ether oxide.

11. The electrolyte of claim 1 wherein Ra is an alkyl.

12. The electrolyte of claim 1 which comprises an ionizable salt.

13. The electrolyte of claim 12 wherein the salt is selected from the group consisting of lithium perchlorate and lithium trifluoromethanesulfonate.

14. The electrolyte of claim 13 wherein the salt is present in the range from about 1.5 to 25% by weight.

15. An electrochemical secondary or primary cell wherein the electrode material includes an improved amorphous, single phase solid electrolyte which possesses improved ionic conductivity, absence of crystallinity, thermo dynamical stability, high cation solubility and improved elasticity at ambient temperatures, which electrolyte is a random polyether copolymer of ethylene oxide and an ether oxide selected from the group consisting of a substituted ether oxide of the formula

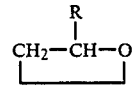

wherein R is RA, wherein Ra is alkyl, alkenyl, or alkynyl having 1 to 12 carbon atoms or —$CH_2$—O—Re—Ra wherein Ra is defined above, Re is a polyether of the formula —$(CH_2$—$CH_2$—O$)_p$— wherein p is an integer from 0 to 10 and a cyclic ether wherein the ring has more than 3 carbon atoms.

16. The electrochemical cell of claim 15 wherein said copolymer is cross-linked.

17. The electrochemical cell of claim 16 wherein the cross-linking is by means of a short cross-linking agent selected from the group consisting of silicon, cadmium, boron, titanium, aluminum, zinc, magnesium and tin.

18. The electrochemical cell of claim 15 wherein the ether oxide is a cyclic ether oxide.

19. The electrochemical cell of claim 15 which comprises an ionizable salt.

20. An electrochemical generator which comprises a negative electrode and a positive electrode separated from each other by an improved amorphous, single phase solid electrolyte which possesses improved ionic conductivity, absence of crystallinity, thermo dynamical stability, high cation solubility and improved elasticity at ambient temperatures, which electrolyte is a random polyether copolymer of ethylene oxide and an ether oxide selected from the group consisting of a substituted ether oxide of the formula

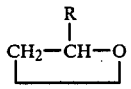

wherein R is Ra, wherein Ra is alkyl, alkenyl, or alkynyl having 1 to 12 carbon atoms or —$CH_2$—O—Re—Ra wherein Ra is defined above, Re is a polyether of the formula —$(CH_2$—$CH_2$O$)_p$— wherein p is an integer from 0 to 10 and a cyclic ether wherein the ring has more than 3 carbon atoms.

21. The electrochemical generator of claim 20 wherein said copolymer is cross-linked.

22. The electrochemical generator of claim 21 wherein the cross-linking is by means of a short cross-linking agent selected from the group consisting of silicon, cadmium, boron, titanium, aluminum, zinc, magnesium and tin.

23. The electrochemical generator of claim 20 wherein the ether oxide is a cyclic ether oxide.

24. The electrochemical generator of claim 20 which comprises an ionizable salt.

* * * * *